(12) United States Patent
Brown et al.

(10) Patent No.: US 10,745,286 B2
(45) Date of Patent: Aug. 18, 2020

(54) METHODS AND COMPOSITIONS TO PREVENT CAKING OF SODIUM CHLORIDE AND PREVENT TRANSITION METAL STAINS

(71) Applicant: Compass Minerals America Inc., Overland Park, KS (US)

(72) Inventors: Geoffrey A. Brown, Wichita, KS (US); Joshua M. Shipman, McPherson, KS (US)

(73) Assignee: Compass Minerals America Inc., Overland Park, KS (US)

( * ) Notice: Subject to any disclaimer, the term of this patent is extended or adjusted under 35 U.S.C. 154(b) by 118 days.

(21) Appl. No.: 14/018,039

(22) Filed: Sep. 4, 2013

(65) Prior Publication Data

US 2014/0065288 A1  Mar. 6, 2014

Related U.S. Application Data

(60) Provisional application No. 61/697,186, filed on Sep. 5, 2012.

(51) Int. Cl.
 *C01D 3/26* (2006.01)
 *A23P 10/43* (2016.01)
 *A23L 27/40* (2016.01)

(52) U.S. Cl.
 CPC ............... *C01D 3/26* (2013.01); *A23L 27/40* (2016.08); *A23P 10/43* (2016.08)

(58) Field of Classification Search
 CPC .... C01D 3/26; A61Q 1/12; D01F 6/16; C08F 8/44; C08F 20/06; A23P 10/43; A23L 27/40
 USPC ...................................................... 426/649
 See application file for complete search history.

(56) References Cited

U.S. PATENT DOCUMENTS

| | | | |
|---|---|---|---|
| 3,036,884 A | | 5/1962 | Kaufmann |
| 3,493,594 A | * | 2/1970 | Bennet et al. ................ 556/147 |
| 3,767,689 A | | 10/1973 | Donovan et al. |
| 3,790,610 A | * | 2/1974 | Lum et al. ............. C01G 45/00 134/3 |
| 4,051,228 A | | 9/1977 | Knorre et al. |
| 4,090,013 A | * | 5/1978 | Ganslaw et al. ........... 525/329.9 |
| 4,990,278 A | | 2/1991 | Wyeth |
| 5,631,038 A | | 5/1997 | Kurtz et al. |
| 6,491,964 B1 | | 12/2002 | Setz et al. |
| 6,800,263 B1 | | 10/2004 | Boon |
| 7,128,940 B2 | | 10/2006 | Geertman |
| 7,938,985 B2 | | 5/2011 | Hashimoto et al. |
| 8,197,878 B2 | | 6/2012 | Chigurupati |
| 2001/0036936 A1 | * | 11/2001 | Day et al. ..................... 514/102 |
| 2004/0062785 A1 | * | 4/2004 | Parker ........................... 424/410 |
| 2004/0079919 A1 | * | 4/2004 | Sapienza et al. ............... 252/70 |
| 2005/0079273 A1 | | 4/2005 | Geertman |
| 2006/0094637 A1 | * | 5/2006 | Liang et al. .................. 510/499 |
| 2010/0294981 A1 | * | 11/2010 | Poe et al. ........................ 252/70 |
| 2012/0058232 A1 | | 3/2012 | Liu et al. |
| 2012/0129952 A1 | | 5/2012 | Bakkenes et al. |

FOREIGN PATENT DOCUMENTS

| | | | | |
|---|---|---|---|---|
| CA | 2030126 A | * | 5/1991 | |
| DE | 10026864 A1 | * | 12/2001 | |
| GB | 420533 A | * | 12/1934 | |
| JP | 2003-160364 | | 6/2003 | |
| JP | 2005-082426 | | 3/2005 | |
| WO | WO 2006087302 A1 | * | 8/2006 | |
| WO | WO 2011044135 A1 | * | 4/2011 | ............... C09K 3/18 |
| WO | 2011073017 | | 6/2011 | |

OTHER PUBLICATIONS

Machine Translation of Roth et al., DE 10026864, Dec. 2001.*
Rajendran et al., "Corrosion Inhibition by HEDP-Zn(2+) System for Milld Steel in Low Chloride Media," Mar.-Apr. 1999, Bulletin of Electrochemistry, 15 (3-4), pp. 131-134.*
Thwater, "HEDP", Mar. 2008, retrieved from the Internet: http://web.archive.org/web/20080309093937/http://www.thwater.net/01-HEDP.htm.*
International Search Report and Written Opinion dated Nov. 12, 2013 in corresponding PCT/US2013/058035 filed on Sep. 4, 2013.

* cited by examiner

*Primary Examiner* — Lien T Tran
*Assistant Examiner* — Tynesha L McClain-Coleman
(74) *Attorney, Agent, or Firm* — Hovey Williams LLP

(57) ABSTRACT

Anticaking agents for inhibiting or preventing caking of inorganic salt granules are provided. The anticaking agents comprise a coordination complex of iron and a salt anion of an organic acid, wherein the salt anion is selected from the group consisting of malate, polyacrylate, diphosphonate, and mixtures thereof. Free-flowing, solid salt compositions resistant to caking are also described herein, along with methods of melting ice and/or snow on a surface or inhibiting the accumulation or formation of ice and/or snow on a surface, and methods of preventing or inhibiting caking of solid inorganic salt granules.

25 Claims, No Drawings

METHODS AND COMPOSITIONS TO PREVENT CAKING OF SODIUM CHLORIDE AND PREVENT TRANSITION METAL STAINS

CROSS-REFERENCE TO RELATED APPLICATIONS

The present application claims the priority benefit of U.S. Provisional Patent Application Ser. No. 61/697,186, filed Sep. 5, 2012, entitled METHODS AND COMPOSITIONS TO PREVENT CAKING OF SODIUM CHLORIDE AND PREVENT TRANSITION METAL STAINS, incorporated by reference in its entirety herein.

BACKGROUND OF THE INVENTION

Field of the Invention

The present invention relates to anticaking and anticorrosion agents for inorganic salts.

Description of Related Art

When exposed to conditions of varying atmospheric humidity, inorganic salts, such as sodium chloride (NaCl), cake or harden due to the formation of crystalline salt bridges that effectively welds adjacent salt crystals together. This results in the formation of large clumps, as well as a hardened crust on the surface of salt piles, and is detrimental to the ease of handling and applying the salt. This agglomeration, clumping, crusting, and/or hardening between individual salt granules is referred to herein (and in the art) as "caking." Caking occurs because of the hygroscopic nature of salt. Thus, at higher humidity, water is trapped between adjacent salt granules and dissolves salt at the crystal interface. This water evaporates as the humidity falls, which leaves behind a salt bridge or weld between and among the granules. Sodium ferrocyanide, also known as yellow prussiate of soda or YPS, has become well known as an effective anticaking agent for sodium chloride. However, YPS is undesirable in certain applications, such as those that involve the electrolytic generation of chlorine (e.g., industrial chloralkali processes and/or salt water pool chlorinators). These processes use electricity to convert chloride anions (Cl$^-$) into free available chlorine (Cl$^+$) in the form of sodium hypochlorite (NaOCl). During the electrolytic process, chlorine can react with nitrogen-containing compounds such as ammonia or the cyanide moiety of YPS to produce volatile, explosive nitrogen trichloride (NCl$_3$). In order to minimize the formation of undesirable NCl$_3$, operators limit or proscribe the use of nitrogenous compounds for the electrolytic generation of chlorine. Moreover, YPS is the subject of continuing environmental scrutiny, which underscores the need for YPS-free and nitrogen-free anticaking agents for inorganic salts.

In light of YPS's undesirability for certain applications, alternative compositions and methods to deter the caking of inorganic salts have been developed, including the use of carbohydrate-metal complexes, iron ammonium complexes of polyhydroxycarboxylic acids, tartaric acid, and meso-tartaric acid. However, these alternatives have several drawbacks. For example, meso-tartaric acid is very expensive to purchase and difficult to prepare. Meso-tartaric acid requires heating a solution of d-tartaric acid in sodium hydroxide for two hours at 118° C. (244.4° F.). After cooling this solution, hydrochloric acid must be added to adjust the pH to 6.

In addition to caking and hardening, another consideration when using inorganic salts is the corrosion they can cause when used to device roadways. In view of these concerns, organizations such as the Pacific Northwest Snowfighters (PNS) Association have set specifications for products used to melt snow and ice. This consortium of U.S. and British Columbia transportation agencies mandates tests to measure the corrosion rates in deicers in accordance with the National Association of Corrosion Engineers (NACE) Standard TM0169, as modified by PNS. In order for a corrosion inhibited snow and ice control product to meet this standard, it must demonstrate that it is at least 70% less corrosive than sodium chloride alone. Improved compositions and methods that can prevent or reduce the caking of inorganic salts and concomitantly reduce corrosion would be exceptionally useful and novel.

In addition to anticaking agents for bulk deicing salt, various substances are used with edible salts, such as potassium or sodium chloride. For example, silicon dioxide has been used in food salt as an anticaking agent. Garlic, onion, peppers, herbs, spices, and sugars are often mixed with salts to reduce caking as well as impart unique flavors to food grade salts. Various acids, such as uric acid, lactic acid, citric acid, and malic acid can act as taste modifiers for edible salts. The use of acids, such as malic acid, for taste modification however, requires the acids to be applied in the acid form in order for them to impart the desired flavor. That is to say, neutralization of the acidulants renders them non-acidic and destroys their ability to produce the desired tanginess.

Thus, there remains a need in the art for improved anticaking agents for inorganic salts, such as NaCl, KCl, and MgCl$_2$.

SUMMARY OF THE INVENTION

The present invention is broadly concerned with anticaking agents for inhibiting or preventing caking of inorganic salt granules. The anticaking agents comprise a coordination complex of iron and a salt anion of an organic acid, wherein the salt anion is selected from the group consisting of malates, polyacrylates, diphosphonates, and mixtures thereof.

Free-flowing, solid salt compositions resistant to caking are also described herein. The salt composition comprises an anticaking agent and an inorganic salt. The anticaking agent comprises a coordination complex of iron and a salt anion of an organic acid, wherein the salt anion is selected from the group consisting of malates, polyacrylates, diphosphonates, and mixtures thereof.

The invention is also concerned with methods of melting ice and/or snow on a surface or inhibiting the accumulation or formation of ice and/or snow on a surface. The method comprises applying a salt composition comprising an anticaking agent and an inorganic salt to the surface. The anticaking agent comprises a coordination complex of iron and a salt anion of an organic acid, wherein the salt anion is selected from the group consisting of malates, polyacrylates, diphosphonates, and mixtures thereof.

A method of preventing or inhibiting caking of solid inorganic salt granules is also described. The method comprises providing an anticaking agent (optionally) dispersed or dissolved in a solvent system, and applying the anticaking agent to the inorganic salt granules to yield treated inorganic salt granules, wherein the treated inorganic salt granules are resistant to caking. The anticaking agent comprises a coordination complex of iron and a salt anion of an organic acid, wherein the salt anion is selected from the group consisting of malates, polyacrylates, diphosphonates, and mixtures thereof.

DETAILED DESCRIPTION

In more detail, the present invention is concerned with anticaking agents for inhibiting and/or preventing caking of inorganic salt granules, particularly when stored, for example, in salt piles, under ambient conditions. The terms "inhibiting," "preventing," and the like, as used herein, mean that caking may be completely avoided in the treated salt, or is at least substantially reduced or lessened as compared to untreated salt. In other words, even though some caking may still occur, the overall degree or severity of caking is lessened or minimal as compared to untreated salt, such that the anticaking agent is still considered to "prevent" and/or "inhibit" caking. The term "ambient conditions" refers to uncontrolled (changing) atmospheric conditions, such as temperature, humidity, at the like. In one or more embodiments, the anticaking agents not only inhibit caking, but also meet PNS anti-corrosion performance standards, inhibit or prevent scale formation, and/or inhibit or prevent transition metal staining.

The anticaking agents can be used to preserve treated solid inorganic salt granules in free-flowing form. The term "solid" salt is used herein to refer to dry or substantially dry (i.e., non-liquid) salt compositions, as distinguished from liquid salt brines. Such solid salts will generally have a moisture content of from about 0% to about 6%, preferably from about 0% to about 0.1%, and more preferably from about 0% to about 0.03%, based upon the total weight of the salt taken as 100% by weight. The inorganic salt is in the form of granules, wherein the term "granule" is used to encompass various particulate or granular forms of salt, including granules and particles, as well as pellets, cubes, flakes, powders, crystals, and mixtures thereof. The term "free-flowing" means that the individual salt granules are easily dispersible, do not form clumps or a crust, or have minimal clumping, aggregation, agglomeration, or crusting between individual granules or groups of granules that is readily broken apart (dispersible).

Various inorganic salts are suitable for use herein, with sodium chloride being particularly preferred. It will be appreciated that inorganic salt mixtures containing sodium chloride mixed with potassium and/or magnesium chloride can be used in the invention. For example, mixtures of chloride salts comprising at least about 25% by weight sodium chloride can be used in the invention (preferably at least about 50% by weight sodium chloride, more preferably at least about 75% by weight sodium chloride, and even more preferably at least about 99% by weight sodium chloride), based upon the total weight of chloride salts taken as 100% by weight. Exemplary salt sources include rock salt, solar salt, evaporated salt, mechanically evaporated, sea salt, and mixtures thereof. The anticaking agents can be used for food salt (e.g., table salt, kosher salt (when malic acid is used), etc.), deicing salt, water softener salt, or any other type of solid salt where maintaining free-flowing salt granules are desired.

The anticaking agent comprises a coordination complex of iron and salt anion(s) of an organic acid. The iron is selected from the group consisting of $Fe^{2+}$, $Fe^{3+}$, $Fe^{4+}$, and combinations thereof, with $Fe^{2+}$ being particularly preferred. The salt anion is selected from the group consisting of malates, polyacrylates, diphosphonates, and mixtures thereof. The coordination complex is formed by first forming an aqueous solution of the organic acid, for example, by mixing the organic acid with a solvent system. Suitable solvent systems will include a solvent selected from the group consisting of water, or any other solvent capable of dissolving or effectively dispersing the organic acid, and mixtures thereof. Suitable organic acids are selected from the group consisting of malic acid, polyacrylic acid, 1-hydroxyethane 1,1-diphosphonic acid (HEDP), and mixtures thereof. Salt derivatives of the organic acid are then formed by neutralizing the organic acid in solution with a base. In one or more embodiments, an alkaline solution is added to the organic acid in solution until the pH of the resulting solution is from about 5 to about 9, more preferably from about 6 to about 8, and even more preferably about 7. Suitable alkaline solutions include hydroxides of alkali metals and alkaline earth metals, such as NaOH, KOH, $Ca(OH)_2$, $Mg(OH)_2$. and the like.

The resulting organic acid salt derivatives are then mixed in solution with a source of iron to yield a coordination complex of iron and organic acid salt ligands. In more detail, the negatively charged organic acid salts (anions) form ligands with the positively charged iron ions to form the coordination complex in solution. Suitable sources of iron include any compound capable of dissociating to yield $Fe^{2+}$, $Fe^{3+}$, or $Fe^{4+}$ ions, such as ferrous chloride, ferric chloride, ferrous sulfate, ferric sulfate, ferrous gluconate, ferric gluconate, and the like. The source of iron is generally first dispersed in an aqueous solution at a level of from about 0.1 to about 30%, preferably from about 0.5 to about 10%, and more preferably from about 1 to about 3%, based upon the total weight of the solution taken as 100% by weight. The iron solution is then mixed with the organic acid salt derivative solution in an amount appropriate to provide a sufficient number of organic acid salt anions to chelate the iron ions. Thus, it will be appreciated that the appropriate molar ratio of acid to iron will depend on the oxidation state of the iron used, as well as the type of organic acid. For example, for malic acid or 1-hydroxyethane 1,1-diphosphonic acid, the molar ratio of acid to iron(II) is about 2:1. However, for polyacrylic acid, the molar ratio of acid to iron will depend upon the molecular weight of the particular polymer used, and can be calculated as described in the examples below. In one or more embodiments, for polyacrylic acid, the molar ratio of acid to iron(II) is about 4:1. It will be appreciated that a single type of coordination complex can be used in the anticaking agent, or a mixture of coordination complexes of iron and two or more different salt anions can be used. For example, iron malate coordination complexes can be used in a mixture with iron polyacrylate coordination complexes. Likewise, either iron malate and/or iron polyacrylate coordination complexes could be mixed with iron diphosphonate coordination complexes.

As noted above, the coordination complex is formed in solution. Advantageously, the anticaking agent can be applied directly to the inorganic salt without further processing if desired. That is, the anticaking agent does not have to be heated or subjected to isomerization reactions or other further processing for effective anticaking performance. Thus, in one or more embodiments, the anticaking agent comprises the coordination complex dispersed or dissolved in a solvent system. Suitable solvent systems will include a solvent or mixture of solvents described above. In one or more embodiments, the coordination complex is present in the solvent system at a level of from about 0.01 to about 60%, preferably from about 1 to about 20%, and more preferably from about 2 to about 5%, based upon the total weight of the solution taken as 100% by weight.

Another advantage of the present invention is that other additives or ingredients do not need to be added to or mixed with the coordination complex to achieve adequate anticaking performance. Thus, in one or more embodiments, the anticaking agent consists essentially (or even consists) of the coordination complex. In one or more embodiments, the anticaking agent consists essentially (or even consists) of the coordination complex dispersed or dissolved in the solvent system. In one or more embodiments, the anticaking agent is essentially free of various additional ingredients, such as silicon dioxide, cyanides, tartaric acid, tartaric acid derivatives, ammonium, carbohydrates, saccharides, sugar alcohols, ferric acetate, gluconates, surfactants, silicas, silicates, silicoaluminates, carbonates, metal oxides, nitrogen, carboxylic acids, acidulants, taste modifiers, or any combination thereof. The term "essentially free," as used herein, means that no significant amount of that ingredient is purposefully added to the composition to impart a certain characteristic to the composition (as contrasted with the intentional ingredients noted herein), it being understood that incidental elements and/or impurities may sometimes find their way into a desired end product (e.g., due to contamination from incidental additives, contact with processing and/or holding equipment, etc.). Preferably, the anticaking agent comprises less than about 5%, more preferably less than about 1%, and even more preferably less than about 0.5% by weight of the foregoing excluded ingredients (alone or in combination), based upon the total weight of the anticaking agent taken as 100% by weight.

In use, the anticaking agent (optionally in a solvent system) is applied to an inorganic salt, and generally to a quantity (i.e., plurality, pile, load, batch, heap, stack, etc.) of inorganic salt granules. The quantity of inorganic salt will usually have a moisture content of from about 0.1% to about 6%, preferably from about 0.1% to about 1%, and more preferably from about 0.1% to about 0.2%, based upon the total weight of the quantity of salt taken as 100% by weight. The anticaking agent is applied at a level of from about 0.01 ppm to about 500 ppm iron, preferably from about 5 ppm to about 100 ppm, and even more preferably from about 10 ppm to about 50 ppm iron. The anticaking agent is applied at a level of from about 0.2 ppm to about 1,100 ppm salt anion, preferably from about 11 ppm to about 220 ppm, and even more preferably from about 22 ppm to about 110 ppm salt anion.

In one or more embodiments, the inorganic salt granules and anticaking agent can be mixed together so that the anticaking agent is substantially uniformly distributed throughout the quantity of granules. Thus, a substantially homogenous treated inorganic salt composition is provided in one or more embodiments. The term "substantially homogenous" means that the anticaking agent and inorganic salt are evenly distributed throughout the admixture and do not segregate from one another. In one or more embodiments, the anticaking agent is applied only to the outside layer of the quantity of granules to prevent crusting. In other words, it will be appreciated that in the case of large salt piles (e.g., deicing salts), caking can sometimes be a self-limiting condition because only the other layer of granules are exposed to the changing ambient environment, whereas interior granules are not subjected to the environment. Thus, in some circumstances it may be desirable to utilize the anticaking agent to prevent or inhibit crust formation in the outer layer of granules, instead of inter-mixing the anticaking agent with the entire pile of salt granules.

Regardless of the embodiment, application of the anticaking agent to the inorganic salt results in treated salt that is free-flowing and resistant to caking. Thus, in one or more embodiments, a free-flowing, solid inorganic salt composition resistant to caking is described herein. In one or more embodiments, the anticaking agent forms at least a partial coating on the surface of the treated inorganic salt granules.

Advantageously, additional ingredients do not need to be added to the inorganic salt compositions to achieve anticaking. Thus, in one or more embodiments, treated inorganic salt compositions according to the invention will consist essentially (or even consist) of the inorganic salt and the anticaking agents described herein. In one or more embodiments, the treated inorganic salt compositions are essentially free of various additional ingredients, such as silicon dioxide, cyanides, tartaric acid, tartaric acid derivatives, ammonium, carbohydrates, saccharides, sugar alcohols, ferric acetate, gluconates, surfactants, silicas, silicates, silicoaluminates, carbonates, metal oxides, nitrogen, carboxylic acids, acidulants, taste modifiers, or any combination thereof. Preferably, the treated inorganic salt compositions comprise less than about 0.0008%, more preferably less than about 0.00016%, and even more preferably less than about 0.00008% by weight of the foregoing excluded ingredients (alone or in combination), based upon the total weight of the treated salt composition taken as 100% by weight.

It will be appreciated that other types of additives unrelated to caking may be included in the salt composition, depending on the final desired use. Optional ingredients that may be present in the inorganic salt compositions (which impart characteristics unrelated to anticaking) include antifoaming agents, corrosion inhibitors, dyes, fragrances, chelators, sealants, and mixtures thereof.

Treated inorganic salt according to the invention finds a number of uses where caking is to be avoided. In one or more embodiments, methods of melting ice and/or snow on a surface or inhibiting the accumulation or formation of ice and/or snow on a surface are provided. The methods comprise applying the treated inorganic salt compositions described herein to the surface. These methods are useful for roadways, driveways, walkways, sidewalks, patios, porches, parking lots, and other paved surfaces. Advantageously, the treated salt remains free-flowing even after storage, which facilitates distribution and dispersal of the salt granules in a substantially uniform manner over the surface. In other words, the treated salt is resistant to clumping or forming large, hard chunks of salt granules which are difficult to break apart and/or apply to the surface for effective deicing. In one or more embodiments, the solid inorganic salt compositions can be mixed with water to first create a liquid brine which is then sprayed, puddled, or dribbled onto the surface. Because the treated solid inorganic salt is resistant to caking, the individual (non-welded) salt granules will also more readily dissolve and/or disperse into solution to create the brine. The treated deicing salt can be used on surfaces that are substantially free of ice and/or snow prior to applying the deicer (i.e., the salt can be applied before it snows), or they can be applied to surfaces already covered (at least partially) with snow and/or ice. Thus, the deicer is applied to the snow and/or ice on the surface and initiates the melting thereof.

The anticaking agents have also been shown to have some anticorrosive properties. Thus, treated salt compositions according to the invention will also be at least 70% less corrosive than untreated sodium chloride, when subjected to NACE Standard TM0169-95, as modified by the PNS. The procedure for this corrosion test is described in the examples below.

In addition to being anticorrosive, certain embodiments of the invention also prevent or inhibit scaling, as well as staining from transition metals. In one or more embodiments, coordination complexes of iron and polyacrylate offer additional benefits for electrolytic chlorination systems, such as chloralkali plants and salt water pools using electrolytic chlorine generators. Specifically, the high heat and high pH found at the cathodes used in electrolytic systems favors the formation of scales such as calcium carbonate, calcium sulfate, barium sulfate, calcium phosphate, and the like. As a result, anti-scalants are often applied to prevent the deposition of scale, which ultimately interferes with the production of chlorine. Therefore, an additional benefit of using iron polyacrylate complex as an anticaking agent is that it can also help prevent scale in electrolytic chlorination systems.

In one or more embodiments, (un-neutralized) polyacrylic acid is used in addition to the anticaking agent in salt compositions to inhibit or prevent the formation of transition metal stains. This is particularly useful for swimming pools equipped with electrolytic chlorine generators, since they require the addition of hundreds of pounds of sodium chloride for routine operation. However, if the salt is contaminated with transition metals, such as iron, copper or manganese, staining of cementitious surfaces in and/or around the pool is likely to occur. Using a polyacrylic acid additive in the salt compositions, along with the anticaking agents, offers unique benefits in that the treated salt compositions can effectively chelate transition metals and prevent staining of pool surfaces. When present, the polyacrylic acid is used at a level of from about 0.01 to about 30%, more preferably from about 0.1 to about 3%, and even more preferably from about 0.2 to about 0.5% by weight, based upon the total weight of the salt composition taken as 100% by weight.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the invention. It is to be understood, however, that these examples are provided by way of illustration and nothing therein should be taken as a limitation upon the overall scope of the invention.

Example 1

Caking Prevention of Coarse, Wet Salt in Model Railcars

Anticaking solutions were prepared using polyacrylic acid (PAA) (Mw~3,000 g/mol), malic acid, malonic acid, citric acid, succinic acid, ethylenediaminetetraacetic acid (EDTA), or etidronic acid (aka 1-hydroxyethane 1,1-diphosphonic acid (HEDP)). The acids were added to respective beakers with high purity water and neutralized (neutralized to ~pH 7 with 10N NaOH) to create stock solutions of the organic acid salts. Except for PAA, the neutralized acid solutions were each added to yield 3% total volume and mixed with a stock solution of 25% ferrous chloride to obtain a final acid/iron mole ratio of about 2 to 1. The molar ratio of PAA to iron was calculated by estimating the number of acrylic monomers in the polymer chain based on its molecular weight. The molecular weight of acrylic acid is 72.062 g/mol. Therefore, a polymer with a molecular weight of 3,000 g/mol would contain approximately 42 acrylic acid monomers. Since acrylate is monocarboxylic, four monomers would be required to chelate one $Fe^{2+}$ atom. This means that a 3,000 molecular weight PAA polymer would be able to chelate about 11 iron atoms (4:1 molar ratio). Untreated salt and solutions of yellow prussiate of soda (YPS; 7 ppm) were used as controls.

Approximately 21 lbs. of coarse, wet solar salt containing about 3.5% water were placed in a mixing device, to which the neutralized organic acid/iron mixtures were added. The amount of the neutralized acid/iron mixture added was sufficient to yield about 3-6 ppm of iron per kilogram of salt. The amount of anticaking solution used ranged from 4 mL to 15 mL for the entire 21 lb. mass of salt. After mixing for approximately 20 minutes, 20 lbs. of the treated salt were removed and placed into a metal replica of a railcar (hopper). The dimensions of the hopper were 24"×14"×6" (L×W×H). The hopper was subsequently placed into a 120° F. oven for roughly 72 hr. to dry the wet salt.

The railcar replica was constructed with a bottom slide gate for the salt to flow through when opened. Even with vigorous agitation, untreated salt (without an anticaking agent) formed large clumps and could not flow through the slide gate. Similarly, salt treated with four neutralized organic acids complexed with iron, EDTA, citric, succinic, and malonic acid, were not effective anticaking agents. However, salt treated with YPS (control) and with anticaking agents containing iron complexed with neutralized PAA, malic, or HEDP flowed through the slide gate after agitation.

Example 2

Caking Prevention of Coarse, Wet Salt in Model Railcars Using Anticaking Blends

The anticaking performance of two combinations of the PAA (Mw~3,000 g/mol) and malic acid compositions of Example 1 were evaluated on wet salt in the same model railcars. YPS (40 and 100 ppm) were used as controls.

Approximately 21 pounds of coarse, wet solar salt containing about 3.5% to 4% water were placed in a mixing device, to which a neutralized organic acid/iron mixture was added. The amount of the neutralized acid/iron mixture added was sufficient to yield about 18 ppm of iron per kilogram of salt. One blend consisted of a 50%:50% mixture of malic acid and PAA while the other was a 67%:33% mixture. The total amount of anticaking solution used ranged from 25 mL to 30 mL. After mixing for approximately 20 minutes, 20 lb. of the treated salt were removed and placed into a metal replica of a railcar (hopper). The dimensions of the hopper were 24"×14"×6". The hopper was subsequently placed into a 120° F. oven for roughly 72 hr. to dry the wet salt.

Even with vigorous agitation, untreated salt (without an anticaking agent) formed large clumps and could not flow through the bottom slide gate of the hopper when opened. However, salt treated with YPS (control) flowed through the slide gate after very little agitation. Similarly, salt treated with the two neutralized organic acid blends also flowed through with very little agitation. Both blends were more effective than equivalent amounts of the organic acids by themselves and closely resembled YPS at 100 ppm.

Example 3

Anticaking Performance on Mechanically Evaporated Salt

The stock solutions of PAA, citric, succinic, and malic acid described in Example 1 were used to treat, dry mechanically evaporated sodium chloride. For this example, 300 grams of salt were placed in an oven at 200° F. for at least 2 hr. Solutions containing between 0.1 and 1.5 mL of the anticaking solutions of PAA and malic acid described in Example 1 were diluted to 3 mL with deionized water. Upon removal from the oven, the hot salt was spread onto aluminum foil and the diluted solutions were sprayed onto the hot salt with an atomizer, placed in jars and allowed to cool and dry. The process of spraying anticaking solution onto heated salt simulated the process of spraying YPS onto hot salt coming from the evaporator in a salt plant.

The open jars were placed in a humidity chamber set to 32° C. and 75% relative humidity for three days. Controls included untreated salt and salt treated with about 7 ppm YPS. Not surprisingly, the untreated salt clumped under these conditions. Moreover, salt treated with the citric and succinic solutions of Example 1 was also clumped. By contrast, the salt treated with the compositions containing iron complexed with the neutralized acids (PAA and malic acid) was comparable to the YPS control.

Example 4

Stain Prevention with Novel PAA Anticaking Agent

Salt treated with a PAA:iron complex was a surprisingly effective anticaking agent for large, wet salt granules (Example 1), and for small, uniform mechanically evaporated salt granules (Example 3). In additional testing, 300 g of evaporated salt containing about 8 ppm manganese was treated with stain control agents prepared according to the method of Example 3. The stain control agents were 500 ppm citric acid, PAA:iron complex (as in Example 1) plus an additional 3 mL of 30% un-neutralized PAA. The final concentrations used to prevent staining were 4.6 ppm neutralized PAA, 0.9 ppm iron, and 930 ppm un-neutralized PAA.

A 10 gallon aquarium was filled with about 1.5 gallons of tap water, to which sodium carbonate was added to yield a pH of 9.5. Two 9"×5" white plaster plates were placed into the aquarium, beneath the surface of the water. Next, 50 g of untreated salt, salt with citric acid, and salt treated with PAA, as described above, were piled onto the plaster. A small amount (about 1 gram) of calcium hypochlorite was sprinkled above the piles to rapidly oxidize the free manganese and form manganese oxide. The pile of untreated salt quickly formed a brown stain, indicative of manganese oxidization. The pile treated with 500 ppm citric acid also formed a manganese stain, albeit more slowly and less intense than the untreated control. However, the salt pile treated with PAA did not form a manganese oxide stain and the plate remained white.

Example 5

Corrosion Inhibition Using Novel PAA Anticaking Agent

Test methods to measure the corrosion inhibition potential of deicing chemicals have been developed by various organizations and include American Society of Testing Materials (ASTM), National Association of Corrosion Engineers (NACE), Society of Automotive Engineers (SAE) and the State of Washington Department of Transportation (WS-DOT), among others. The PNS (Pacific Northwest Snowfighters Association) has also developed test protocols for evaluating corrosion rates of the different deicers. The PNS requires that tests for corrosion rates in deicers be conducted using the NACE Standard TM0169-95, as modified by PNS. The PNS has modified the NACE procedure so that the test procedure uses 30 mL of a 3% chemical product solution as received per square inch of coupon surface area for the corrosion test. In order for a deicer to be approved by PNS, a corrosion inhibited chemical deicer, is required to be 70% less corrosive to mild steel than sodium chloride.

According to test method, the coupons used for testing are half-inch flat steel washers (approximately 1.38 in.×0.56 in.×0.11 in.) displaying a density of approximately 7.85 grams per cubic centimeter. Coupons must meet ASTM F 436, Type 1, with a Rockwell Hardness of C 38-45. Each coupon used in the test procedure is subjected to the following process to assure accuracy in test results:

Wipe with suitable solvent to remove grease and oil.
Examine each coupon for metallurgical abnormalities and reject those that are suspect to flaws. All coupons are tested for Rockwell Hardness of C 38-45; coupons having hardness outside of this range are rejected.
Acceptable coupons are stamped for identification.
Coupons are acid etched with 1+1 HCl for approximately 2-3 minutes.
The coupons are then quickly rinsed with tap water, distilled water, wiped dried and placed in chloroform. When the coupons are removed from the chloroform for use, they are place on a paper-lined tray (not touching each other) and allowed to air dry in a ventilated hood for a minimum of 15 minutes.
Coupons are measured as specified.
Each coupon shall be weighed to a constant weight. The constant weight shall be two consecutive weighings of each coupon within a minimum of 0.5 milligrams of each other. Removal of incidental flash rusting prior to weighing is not necessary.

Three coupons are used in each chemical product solution and for the distilled water and sodium chloride control standards.

The outside diameter, inside diameter, and the thickness of each coupon is measured twice at 90 degrees from each initial reading and the averages calculated for each measurement. The averages are then used to calculate the surface area of each coupon with the following formula:

$$A=(3.1416/2)(D^2-d^2)+3.1416(t)(D)+3.1416(t)(d)$$

Where:
D=average outside diameter
d=average inside diameter
t=average thickness

ASTM D 1193 Type II distilled water is used to prepare each solution, blank, and control standard. The sodium chloride used to prepare the salt standard shall be of "ANALYZED REAGENT GRADE" quality. A 3% solution of NaCl is prepared by weight, using the reagent grade salt and distilled water (W/V). A 3% solution (W/V) of each chemical product to be tested is prepared using distilled water to dissolve and or dilute the chemical product. All solutions including the distilled water blank are covered and allowed to sit a minimum of 12 hours to stabilize and reach equilibrium, ensure solubility, and to account for any reactivity that may occur.

Approximately 300 milliliters (actual volume is determined by the surface area of test coupons) of each solution as mixed with distilled water and is put into a 500 milliliter Erlenmeyer flask. Each flask is equipped with a rubber stopper that has been drilled to allow a line to run through it. The hole in the rubber stopper is 3-4 millimeters in diameter. One end of the line is attached to a rotating bar and the other end of the line is attached to a plastic frame made to hold coupons inside the flask where three coupons are attached to each plastic frame. The rotating bar is controlled by an electric timer that lowers the bar for 10 minutes then raises the bar for 50 minutes out of the solution but still keeps the coupons inside of the flask for the entire duration of the test. This allows the coupons to be exposed to the test solution 10 minutes of each hour. The corrosion test is then run for 72 hours. No agitation of the solution is made during the corrosion test.

Corrosion tests are conducted at 21-23° C. The room temperature is to be recorded daily during the operation of the test. The room temperature shall be taken with a calibrated thermometer located next to the corrosion-testing instrument. The temperature readings will be used to help determine varying corrosion rates, at this time temperature readings will not be used to correct data.

The coupons are removed from the solution after 72 hours. The coupons are pre-washed under running tap water to remove any loosely adherent corrosion products. They are then placed into glass beakers containing the cleaning acid, concentrated hydrochloric acid (HCL) containing 50 grams/liter $SnCl_2$ (stannous chloride) and 20 grams/liter SbCl3 (antimony trichloride). The two salts are added to the HCL to stop the reaction of the HCL with the steel once the rust or corrosion is removed.

After 15 minutes of cleaning the coupons are removed from the cleaning acid, rinsed with tap water and then distilled water, and wiped with a cloth to clean any deposit from the coupons. They are then returned to the cleaning acid and the procedure is repeated. After cleaning the coupons are rinsed in chloroform, air dried, and weighed. Each coupon shall be weighed to a constant weight. The constant weight shall be two consecutive weighings of each coupon within a minimum of 0.5 milligrams of each other.

The weight loss of each coupon is determined by subtracting the final weight from the original weight. The corrosion rate for each coupon is expressed as mils penetration per year (MPY) by the following formula:

MPY=(weight loss(milligrams))(534)/((area)(time)(metal density))

OR

MPY=(weight loss(milligrams))(534)divided by((area)(time)(metal density)*)(Density is 7.85 g/cc for steel*)

The final MPY value for each solution is determined by calculating an average of the three individual coupons. Average MPY from this point forward will be referred to as only MPY of the solution being tested.

The corrosion value of the distilled water and the reagent grade sodium chloride is critical to this whole process. These are the two base lines used to determine products acceptability in terms of corrosion value only. The level of corrosion attributed to the distilled water must be taken into account to determine the corrected corrosion value. Thus, the corrosion value for the distilled water is subtracted from the total MPY for each of the 3% solutions for each product tested. When this calculation is completed for each product being tested the resulting value indicates the corrected corrosion value.

According to criteria adopted by PNS: "Only corrosion inhibited chemical products that are at least 70% less corrosive than reagent grade sodium chloride may be used." To determine if a product is acceptable, take the corrected corrosion value of the reagent grade sodium chloride and multiply it by 30%.

For this Example, 31 μL of the complexed PAA:iron anticaking solution described in Example 1 were added to 1000 mL of a 3% salt solution to yield a final concentration of 31 ppm PAA and 6 ppm iron. Surprisingly, the results summarized in Table 1 show that the PAA anticaking solution was able to reduce corrosion by 72%. This exceeds the minimum requirement of 70% set by the PNS.

TABLE 1

Corrosion data for novel composition.

| Treatment | % Corrosion Inhibition Relative to 3% NaCl |
|---|---|
| Ultrapure water | 100 |
| 3% NaCl | 0 |
| 3% NaCl + PAA | 72 |

70% or above meets PNS corrosion inhibition requirements.

Example 6

Effectiveness of Anticaking Agents on Rock Salt

The anticaking agents PAA, HEDP, and malic acid described in Example 1 were each added to graduated cylinders to a total volume of 50 mL. A YPS control (7 ppm concentration on the salt) and an untreated control were incorporated as with previous Examples. The mixtures were then poured into a spray container pressured by 50 psi of air. The solutions were sprayed onto 10 lbs. of medium rock salt, mixed well, and poured into a large pile on a plastic surface. The piles were placed in a humidity cabinet for 3 days at 32° C. and 75% relative humidity, followed by 1 day at 90% relative humidity. After the four days, the wet piles were allowed to air dry for 6-12 hrs and dried in the oven at 120° F. for 6-12 hrs. Once the piles cooled to room temperature, observations were made regarding the hardness. The observations are recorded in Table 2.

TABLE 2

Effectiveness of anticaking agents on rock salt.

| Treatment | Observations |
| --- | --- |
| Untreated (no anti-caking agent) | Salt completely solidified. Very hard all the way through. |
| YPS | Thin, hard outer crust. Salt beneath crust crumbled easily. |
| PAA | Very brittle and thin outer crust. Salt beneath crust crumbled easily. |
| HEDP | Very thin outer crust. Salt beneath crust crumbled easily. |
| Malic Acid | Thin outer crust. Salt beneath crust crumbled easily. |

Example 7

Large Scale Field Test with Rock Salt

Examples 1-6 validate the surprising efficacy and novelty of the anticaking compositions, applied individually or as blends, of the present invention under laboratory conditions. In order to demonstrate their performance under field conditions, the PAA, HEDP, and malic acid anticaking solutions of Example 1 were each sprayed onto 2,000-lb quantities of rock salt, which were subsequently packaged into large totes. As in the previous Examples, YPS (40 ppm) and untreated rock salt were used as controls. All totes were stored outdoors at a packaging facility in Goderich, Canada for four weeks. The novel anticaking agents of the instant invention were applied at the concentrations listed in Table 3. The parts per million shown reflect the final concentrations of the anticaking agents relative to the salt. Therefore, 31 ppm of PAA is equivalent to a concentration of 0.0031% PAA on the salt.

TABLE 3

High and low levels of anticaking agents used.

| Anticaking Agent | Low Level | High Level |
| --- | --- | --- |
| PAA | 15.5 ppm PAA, 7 ppm $FeCl_2$ | 31 ppm PAA, 14 ppm $FeCl_2$ |
| HEDP | 22 ppm PAA, 7 ppm $FeCl_2$ | 44 ppm HEDP, 14 ppm $FeCl_2$ |
| Malic Acid | 14.4 ppm PAA, 7 ppm $FeCl_2$ | 28.8 ppm malic acid, 14 ppm $FeCl_2$ |

This field experiment was designed to compare the efficacy of the anticaking agents in Table 3 invention to YPS. An ancillary objective was to determine if performance would be affected by using more or less of the anticaking agents.

During the experiment, there were nine snow events in Goderich, Calif. totaling 35.3 cm (about 13.9 in) of precipitation. Therefore, the totes of salt were repeatedly challenged with moisture throughout the test period.

There were no measurable differences between the high and low levels of the anticaking agents of the present invention (i.e., no dose/effect response). Consistent with the laboratory observations (Examples 1-6), the anticaking compositions rivaled the performance of YPS after four weeks (Table 4) in the field. Since YPS is the industry standard for the majority of salt-based anticaking applications, the performance of the compositions of the instant invention relative to it are especially noteworthy.

TABLE 4

Large scale test of anticaking agents.

| Salt Treatment | Observations |
| --- | --- |
| Untreated | Hard. |
| YPS | Free flowing. |
| PAA | Free flowing |
| HEDP | Free flowing |
| Malic Acid | Initially not free flowing but easily broken up. |

We claim:

1. A free-flowing, solid salt composition comprising:
   an inorganic salt;
   an anticaking agent for inhibiting or preventing caking of inorganic salt granules, said anticaking agent comprising a coordination complex of iron and a salt anion of an organic acid, wherein said salt anion is selected from the group consisting of malates, polyacrylates, diphosphonates, and mixtures thereof; and
   wherein said solid salt composition is resistant to caking.

2. The salt composition of claim 1, wherein said inorganic salt comprises inorganic salt granules, and said anticaking agent forms at least a partial coating on the surface of said inorganic salt granules.

3. The salt composition of claim 1, wherein said inorganic salt is sodium chloride or a mixture of chloride salts comprising at least about 25% by weight sodium chloride.

4. The salt composition of claim 1, wherein said anticaking agent comprises a mixture of two or more different coordination complexes of iron and salt anion selected from the group consisting of malates, polyacrylates, and diphosphonates.

5. The salt composition of claim 1, said composition comprising from about 0.01 ppm to about 500 ppm iron.

6. The salt composition of claim 1, said composition comprising from about 0.2 ppm to about 1,100 ppm salt anion.

7. The salt composition of claim 1, further comprising polyacrylic acid, wherein said salt composition inhibits staining from transition metals.

8. The salt composition of claim 1, said salt composition being at least 70% less corrosive than untreated sodium chloride.

9. The salt composition of claim 1, wherein said inorganic salt is selected from the group consisting of rock salt, solar salt, evaporated salt, mechanically evaporated salt, sea salt, and mixtures thereof.

10. The salt composition of claim 1, wherein said inorganic salt is selected from the group consisting of food salt, deicing salt, and water softener salt.

11. The salt composition of claim 1, said salt composition consisting essentially of said anticaking agent according to claim 1 and said inorganic salt.

12. The salt composition of claim 1, said salt composition being essentially free of silicon dioxide, cyanides, tartaric acid, tartaric acid derivatives, ammonium, carbohydrates, saccharides, sugar alcohols, ferric acetate, gluconates, surfactants, silicas, silicates, silicoaluminates, carbonates, metal oxides, nitrogen, carboxylic acids, acidulants, taste modifiers, or any combination thereof.

13. A method of melting ice and/or snow on a surface or inhibiting accumulation or formation of ice and/or snow on a surface, said method comprising applying a salt composition according to claim 1 to said surface.

14. The method of claim 13, further comprising mixing said salt composition with water to create a liquid brine prior to said applying, wherein said applying comprises spraying, puddling, or dribbling said liquid brine on said surface.

15. The method of claim 13, wherein said surface is substantially free of ice and/or snow prior to said applying.

16. The method of claim 13, wherein said surface comprises ice and/or snow, and wherein said applying comprises applying said composition to said ice and/or snow on said surface.

17. The method of claim 13, wherein said surface is selected from the group consisting of a roadway, driveway, walkway, sidewalk, patio, porch, parking lot, and other paved surfaces.

18. A method of preventing or inhibiting caking of solid inorganic salt granules, said method comprising:
providing an anticaking agent dispersed or dissolved in a solvent system, said anticaking agent comprising a coordination complex of iron and a salt anion of an organic acid, wherein said salt anion is selected from the group consisting of malates, polyacrylates, diphosphonates, and mixtures thereof; and
applying said anticaking agent to said inorganic salt granules to yield a solid salt composition comprising said anticaking agent and a quantity of treated inorganic salt granules, wherein said solid salt composition is resistant to caking.

19. The method of claim 18, wherein said providing comprises:
providing an organic acid selected from the group consisting of malic acid, polyacrylic acid, 1-hydroxyethane 1,1-diphosphonic acid, and mixtures thereof;
neutralizing said organic acid with a base; and
mixing said neutralized organic acid with a source of iron to yield said coordination complex of iron and salt anion selected from the group consisting of malate, polyacrylate, diphosphonate, and mixtures thereof.

20. The method of claim 19, wherein said base is sodium hydroxide.

21. The method of claim 19, wherein said organic acid is polyacrylic acid, the molar ratio of acid to iron being about 4:1.

22. The method of claim 19, wherein said organic acid is malic acid or 1-hydroxyethane 1,1-diphosphonic acid, the molar ratio of acid to iron being about 2:1.

23. The composition of claim 1, wherein caking of the solid salt composition is inhibited as compared to one without said anticaking agent.

24. The method of claim 18, wherein caking of the solid salt composition is inhibited as compared to one without said anticaking agent.

25. The method of claim 18, wherein coordination complex is present in the solvent system at a level of from about 0.01 to about 60%.

* * * * *